(12) United States Patent
Lloyd

(10) Patent No.: US 11,628,776 B2
(45) Date of Patent: Apr. 18, 2023

(54) SHELF FOR PICKUP TRUCK SHELL THAT FOLDS FOR EASY REMOVAL

(71) Applicant: Kenneth Gordon Lloyd, South Jordan, UT (US)

(72) Inventor: Kenneth Gordon Lloyd, South Jordan, UT (US)

( * ) Notice: Subject to any disclaimer, the term of this patent is extended or adjusted under 35 U.S.C. 154(b) by 220 days.

(21) Appl. No.: 16/789,421

(22) Filed: Feb. 12, 2020

(65) Prior Publication Data
US 2020/0369214 A1    Nov. 26, 2020

(51) Int. Cl.
| | |
|---|---|
| *B60R 9/06* | (2006.01) |
| *H01M 4/38* | (2006.01) |
| *H01M 4/58* | (2010.01) |
| *H01M 10/0525* | (2010.01) |
| *B60R 11/00* | (2006.01) |

(52) U.S. Cl.
CPC ............ *B60R 9/06* (2013.01); *H01M 4/382* (2013.01); *H01M 4/58* (2013.01); *H01M 10/0525* (2013.01); *B60R 2011/004* (2013.01); *B60R 2011/0075* (2013.01); *B60R 2011/0082* (2013.01)

(58) Field of Classification Search
CPC .............. B60R 9/06; B60R 2011/008; B60R 2011/0082; B60R 2011/0084; B60J 7/02; B60J 7/022; B60J 7/041; B60J 7/141
USPC .......... 296/100.01, 2, 6, 8, 9, 37.6; 224/402, 224/403
See application file for complete search history.

(56) References Cited

U.S. PATENT DOCUMENTS

| | | | |
|---|---|---|---|
| 5,709,329 A * | 1/1998 | Johnson .................... | B60R 7/04 224/402 |
| 6,224,128 B1 * | 5/2001 | Mains ....................... | B60P 3/36 296/37.6 |
| 2014/0117697 A1 * | 5/2014 | Danhoff .................... | B60P 1/00 296/26.13 |

* cited by examiner

*Primary Examiner* — Dennis H Redder

(57) ABSTRACT

A utility shelf mounted inside the cargo area of a pickup truck equipped with a camper shell. The utility shelf spans across the width of the camper shell resting on the base mounting flanges of the camper shell. The utility shelf has a flat rectangular shelf panel with forward and aft support rails to support objects being transported. Shelf panels are mounted low on the support rails creating a raised edge to keep items in place. Support rails and shelf panel are hinged at midpoint thereby allowing utility shelf to be lifted in the center to fold in half for removal and stowage. Each support rail hinge incorporates a concealed stop to keep the shelf flat when deployed. Support rail hinges are designed to reduce the possibility of pinched fingers while deploying. The ends of each support rail incorporate a tool free adjustable extender to allow for proper fit.

19 Claims, 4 Drawing Sheets

SHELF FOR PICKUP TRUCK SHELL THAT FOLDS FOR EASY REMOVAL

CROSS-REFERENCE TO RELATED APPLICATIONS

This application claims the benefit of Provisional Patent Application 62/825,214 filed Mar. 28, 2019 by the present inventor.

BACKGROUND OF THE INVENTION

Field of Endeavor B60R7/00

This device pertains to the storage or transportation of cargo within the cargo area of a pick-up truck with a camper shell or topper installed.

Often individuals will make shelves for their pick-up camper shell to allow for storage and transportation of items, particularly to keep items elevated above the floor of the cargo area thereby allowing other items to be transported beneath the shelf. The sides of most camper shells taper inward as they approach the roof of the shell making it difficult for a single component shelf to span the width of the camper shell and still be maneuvered into position. This condition requires a shelf to be constructed from multiple components to provide a proper support platform causing assembly and installation to be time consuming. Furthermore this makes removing the shelf, when needed, inconvenient.

Various approaches to shelves for use in a camper shell previously developed are demonstrated as:

U.S. Pat. No. 5,083,828 issued to Joseph C. Accettura published 1992 Jan. 28 discloses a utility shelf to be mounted directly behind the cab of the pick-up to allow transport and storage of small light weight items, accessible through a rear sliding window of the truck cab.

U.S. Pat. No. 6,942,269 issued to David R. Mains 2005 Sep. 13 discloses a shelf system with deployable legs for support is directed more toward use in the rear of a SUV. Support legs do not allow for a completely unobstructed area under the shelf.

U.S. Pat. No. 6,224,128 issued to David R. Mains published 2008 Jan. 15 discloses a slidable and adjustable shelf assembly adapted to be fitted to the rear of a pickup truck with a camper shell, more precisely the side walls while overriding such side walls.

While the foregoing patents reflect the state of art for various methods of increasing the storage and utility of a pickup with a camper she installed, they do not offer the uniqueness of this invention as will be demonstrated with the specifications and drawings provided in this application. It is respectfully stipulated that none of these patents teach or render obvious, singly or when considered in combination, applicant's claimed invention.

BRIEF SUMMARY OF THE INVENTION

This invention is directed toward a load carrying utility shelf to be mounted in a camper shell installed on a pick-up truck being supported above the bed of the pickup by resting on the base mounting flanges on each side of the camper shell, keeping the area under the shelf unobstructed.

This utility shelf is generally comprised of a shelf panel spanning the width of the camper shell, incorporating rails on the fore and aft edges of the panels, providing structural support and a raised edge to aid in keeping items on the shelf. The support rails and shelf panel are hinged at mid span allowing the entire shelf apparatus to fold in half when not in use. The hinges in the support rails offer a concealed stop that allows the shelf to lay flat in the open deployed position without collapsing. The hinges are further designed to significantly reduce the possibility of fingers getting pinched during deployment of the shelf.

This utility shelf can be easily installed, adjusted for proper fit and removed without the use of tools. Adjustment to fit a variety of camper shells is provided by means of rail extenders located at the outermost ends of each support rail, that telescope outward to contact the sides of the camper shell and lock in place to prevent lateral movement of the shelf.

After initial placement and adjustment of this device it offers the convenience of being deployed or removed requiring no other manipulation beyond unfolding to flat position to deploy and folding in half to remove. When folded in half it becomes reasonably compact for stowage.

DRAWINGS COMPONENT REFERENCE NUMERALS

Figure 1:
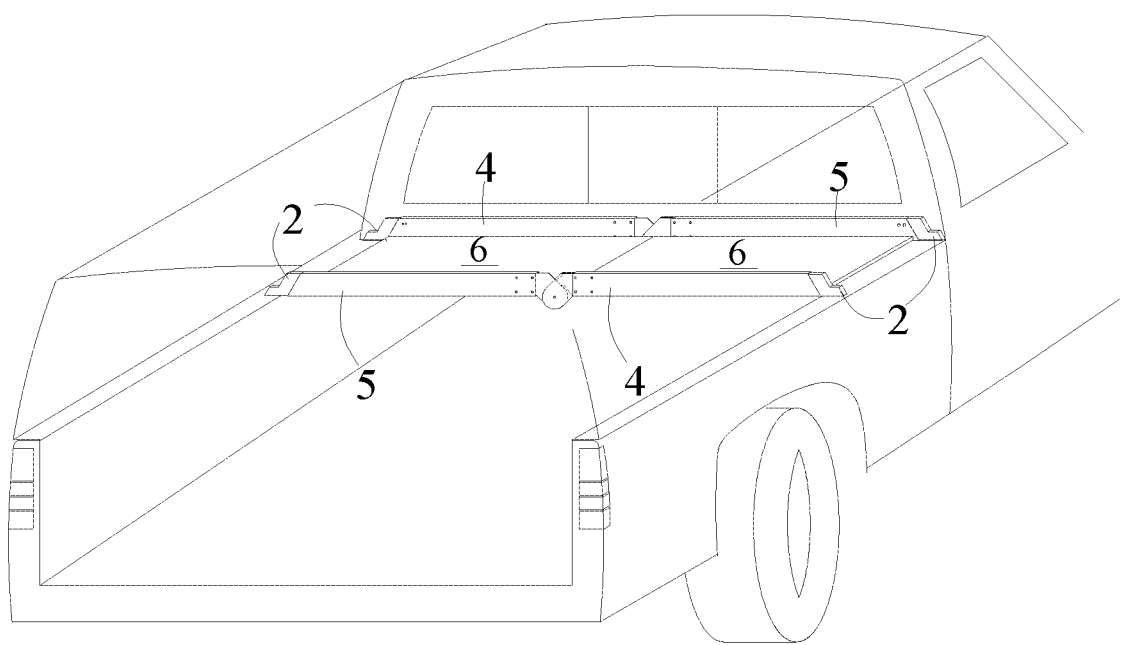
FIG. 1 Prospective view of the shelf installed in the pickup truck shell.
Figure 2:
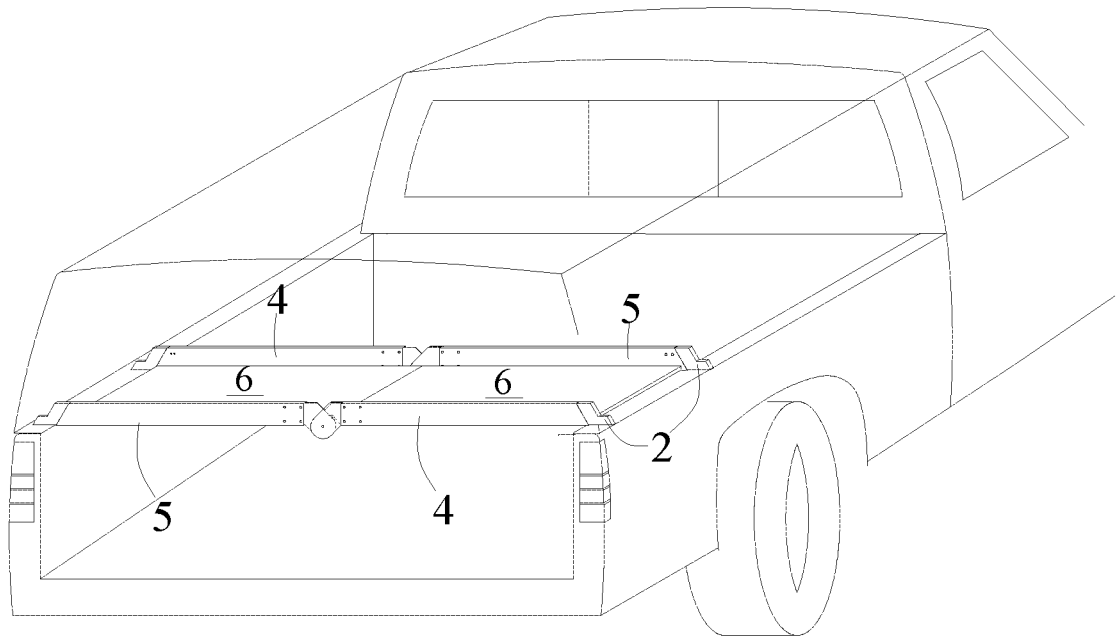
FIG. 2 Prospective view demonstrating an alternate placement of shelf.

2 Adjustable Support rail extenders
4 Support rails (Two required)
5 Support rails (Two required)
6 Shelf platform panels (two pieces)
8 Support rail, panel mounting flange
10 Continuous hinge (well known)
11 Alignment pins (Four required per support rail hinge)
12 Support rail hinge plates (Three required per hinge)
13 Hinge alignment holes
14 Support rail hinge stop
15 Pivotal center aperture
16 Support rail hinge spacers (Two required per hinge)
17 Cylindrical bushing (well known)
18 Washer
20 Rivets (Four required at each support rail attachment)
22 Locking nut
24 Assembly screw (multiple required)
26 Slip resistant pads
28 Assembly screws (multiple required)
30 Push pins (well known)

DETAILED DESCRIPTION OF THE INVENTION

Figure 3:
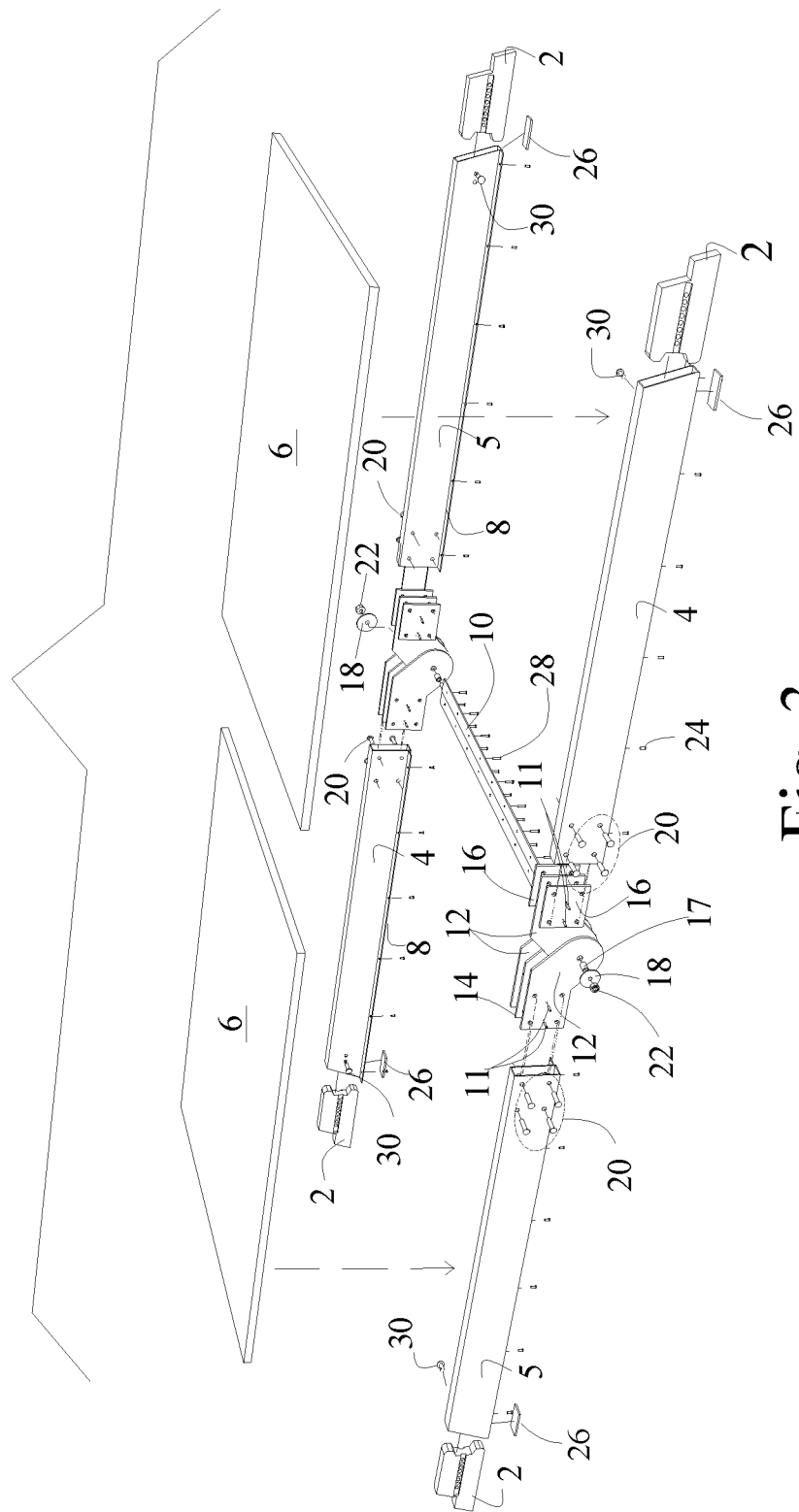
FIG. 3 Exploded view of the shelf and its components.
Figure 4:
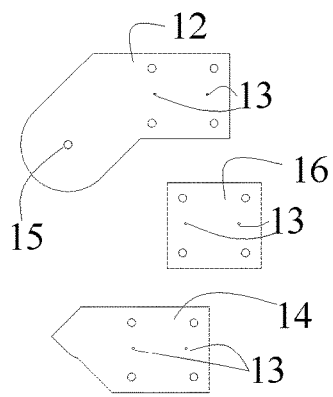
FIG. 4 View of the components for the pinch resistant support rail hinges.
Figure 5:
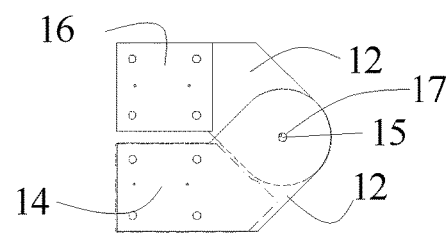
FIG. 5 View of support rail hinge assembly in folded position.
Figure 6:
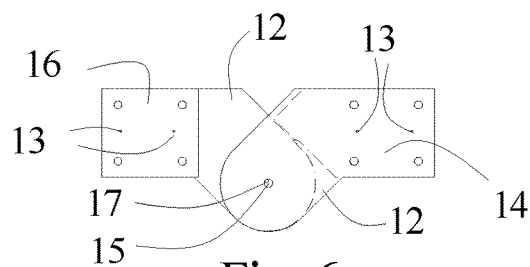
FIG. 6 View of support rail hinge assembly in open position.
Figure 7:
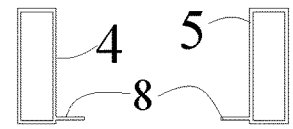
FIG. 7 End view of support rails showing the panel mounting flange.
Figure 8:
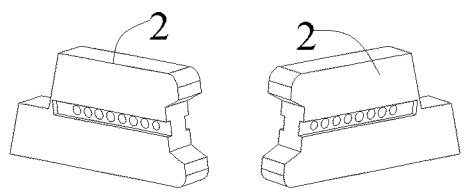
FIG. 8 Adjustable support rail extenders. (front and back views) FIG. 9 View of complete shelf in the open flat position.

The subject utility shelf is heretofore described and assembled (See FIG. 3 on all references unless otherwise noted) as a support rail hinge stop 14 sandwiched between two support rail hinge plates 12 and when aligned with the hinge alignment holes 13 (FIGS. 4, 5, 6) creates a space between said hinge plates 12. Two alignment pins 11 are inserted in the two hinge alignment holes 13 (FIG. 4) holding these three components together creating half of a complete support rail hinge. The second half of a support rail hinge is made by a singular hinge plate 12 sandwiched between two rail hinge spacers 16 and these three components aligned with the hinge alignment holes 13 (FIG. 4) and then held together with two alignment pins 11 creating second half of a support rail hinge. The two halves of the support rail hinge are joined by sliding the hinge half with the two separated hinge plates 12 over the protruding singular hinge plate 12 of the second half of said support rail hinge half and aligning the apertures 15 of the two hinge assembly halves (FIG. 6) at the pivotal center aperture 15 and pressing cylindrical bushing 17 through the aligned apertures producing a complete support rail hinge assembly (FIG. 6). The contact of hinge stop 14 and the singular hinge plate 12 on opposite hinge half create a positive stop when in the flat position (FIG. 6)

Figure 9:
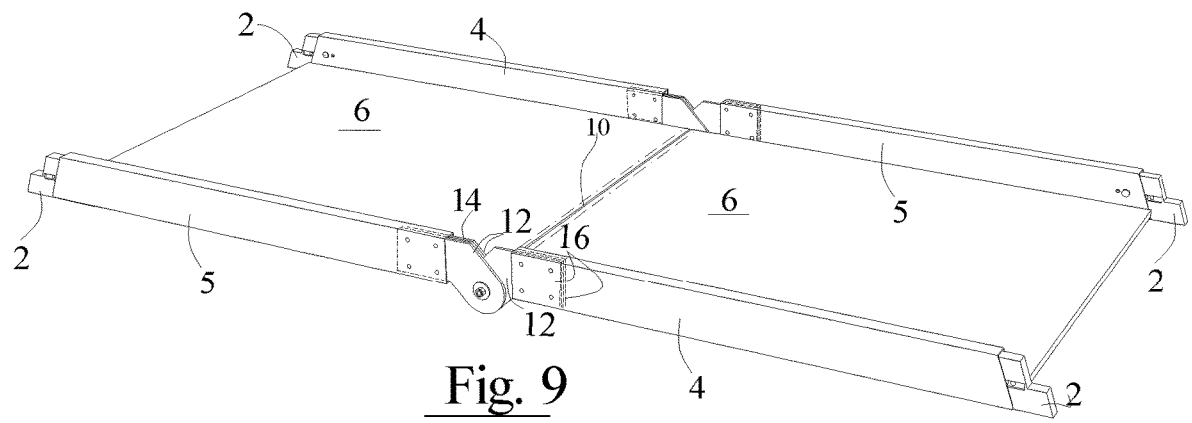
Figure 10:
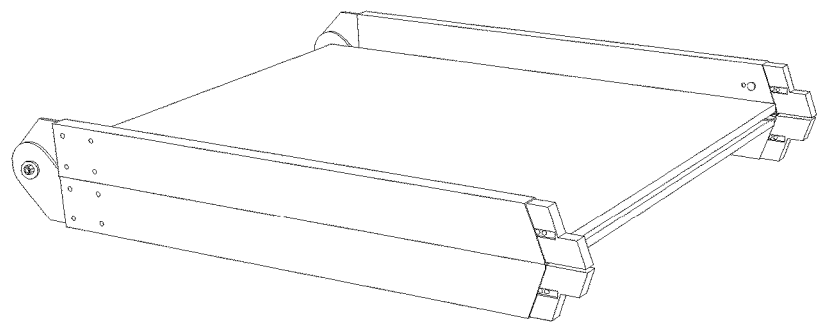
FIG. 10 View of complete shelf folded for stowage.

The outward rectangular ends of a complete support rail hinge assembly (FIG. 6) are inserted in the inward ends of the rectangular tube support rails 4 and 5 (FIG. 9) with support rail flanges 8 oriented the same direction and four holes being drilled through the inward ends of each support rail and assembled components of the support rail hinge then fastened in place with four rivets 20 passing through the holes in each said support rail and hinge completing one of the two support rail assemblies. This identical process is repeated for the second support rail and hinge assembly.

A continuous hinge 10 is cut to the proper length with the pivot pin of the continuous hinge being threaded and protruding at each end sufficient distance to extend through the cylindrical bushing 17, washer 18 and locking nut 22.

With the two completed support rail and hinge assemblies being oriented parallel each other with support rail flanges 8 facing each other the protruding ends of the continuous hinge 10 are inserted through the cylindrical bushings 17 at each support rail hinge pivotal center, with a washer 18 place over the protruding end of continuous hinge pivot pin and locking nut 22 threaded on to the end of the continuous hinge pin at each end of said pin.

Shelf platform panels 6 are placed on the support rail flanges and said panels abutting each other over the center line of continuous hinge 10 and fastened to support rail flanges with multiple assembly screws 24 and fastened to hinge 10 with multiple assembly screws 28.

Slip resistant pads 26 are attached to underside of the outward ends of each support rail 4 and 5 with adhesive. Adjustable support rail extenders 2 are placed in each of the four outward ends of the support rails and are adjusted to fit the vehicle by sliding in or out to contact the side of the camper shell and then held in place by pushing push pin 30 through the hole in the end of each support rail and aligning with closest of the series of holes in rail extender 2.

With the shelf folded in half and placed in approximate desired location fore and aft within the truck and camper shell, place the shelf mid way laterally with the hinges toward to top of the camper shell, the support rails with extenders 2 on the floor of the truck bed and the continuous hinged panel joint running parallel the sides of the truck and camper shell.

Partially unfold the shelf by lifting one of the ends off the floor of the truck bed and placing it on the base flange of one side of the camper shell. While keeping that half in place raise the center of the shelf to a point high enough for the other end to fold out above the opposite side of the camper shell base flange and letting it set on said opposite side as you lower the center of the shelf down to the flat position where it will stop in the flat position.

The support rail extenders 2 may be adjusted by partially pulling out the push pins 30, sliding said extenders outward until the contact the sides of the camper shell and then pushing the push pins 30 back in through the closest hole in the extender thereby locking the extender 2 in place.

The claimed invention is:

1. A utility shelf for storing and transporting items in the cargo area of a pickup truck equipped with a camper shell or topper the utility shelf comprising:
    a flat rectangular shelf platform of sufficient length to span laterally the width of the camper shell in which it is to be disposed,
    support rails affixed to said shelf platform along the forward and rearward edges being of sufficient strength to support the intended cargo,
    a means allowing the entire assembly to fold in half at mid span for convenient placement and removal,
    a means to prevent the shelf from collapse at the fold when deployed for intended use, and
    a means for adjustment to fit varying widths of camper shells thereby eliminating lateral movement,
    wherein the rectangular shelf panel is divided in two pieces at mid span and joined together at said division by means of a continuous hinge being affixed to each of the two said panel pieces
    wherein the hinge is incorporated mid span of each support rail and pivotal centers of said hinge, aligning with a pivotal center of the continuous hinge in the shelf panel.

2. The utility shelf of claim 1, wherein the support rails are of a rectangular tube shape and include a continuous flange along the length of each support rail.

3. The utility shelf of claim 2, wherein the shelf platform is affixed to the flange on the side of each support rail allowing a portion of the support rail to project higher than said shelf platform.

4. The utility shelf of claim 1, wherein the hinge provides a means to positively stop the utility shelf from opening beyond a position in which the shelf is folded out flat yet allowing said assembly to fold against itself.

5. The utility shelf of claim 1, wherein a slip resistant pad is mounted to the underside end of each support rail where they rest upon the pickup truck camper shell.

6. The utility shelf of claim 1, wherein a telescoping extender is incorporated in the outward end of each support rail that extends out to contact the sides of the camper shell to inhibit lateral movement of the shelf assembly.

7. The utility shelf of claim 1, wherein a telescoping extender is incorporated in the support rails to inhibit lateral movement, a tool free means is provided for said extender to be locked into position.

8. A utility shelf for storing and transporting items in the cargo area of a pickup truck equipped with a camper shell or topper the utility shelf comprising:
    a flat rectangular shelf platform of sufficient length to span laterally the width of the camper shell in which it is to be disposed,
    rectangular tube-shaped support rails affixed to said shelf platform along the forward and rearward edges being of sufficient strength to support the intended cargo,
    a continuous flange along the length of each support rail, a means allowing the entire assembly to fold in half at mid span for convenient placement and removal, a means to prevent the shelf from collapsing at the fold when deployed for intended use, and a means for adjustment to fit varying widths of camper shells thereby eliminating lateral movement.

9. The utility shelf of claim 8, wherein a slip resistant pad is mounted to the underside end of each support rail where they rest upon the pickup truck camper shell.

10. The utility shelf of claim 8, wherein a telescoping extender is incorporated in the outward end of each support rail that extends out to contact the sides of the camper shell to inhibit lateral movement of the shelf assembly.

11. The utility shelf of claim 8, wherein a telescoping extender is incorporated in the support rails to inhibit lateral movement, a tool free means is provided for said extender to be locked into position.

12. The utility shelf of claim 8, wherein the rectangular shelf panel is divided in two pieces at mid span and joined together at a division by means of a continuous hinge being affixed to each of the two said panel pieces.

13. The utility shelf of claim 12, wherein the hinge is incorporated mid span of each support rail and pivotal centers of said hinge aligning with a pivotal center of the continuous hinge in the shelf panel.

14. A utility shelf for storing and transporting items in the cargo area of a pickup truck equipped with a camper shell or topper the utility shelf comprising:

a flat rectangular shelf platform of sufficient length to span laterally the width of the camper shell in which it is to be disposed, support rails affixed to said shelf platform along forward and rearward edges being of sufficient strength to support the intended cargo, a hinge allowing the entire assembly to fold in half at mid span for convenient placement and removal, the hinge providing a means to prevent the shelf from collapse at the fold when deployed for intended use, and a means for adjustment to fit varying widths of camper shells thereby eliminating lateral movement.

15. The utility shelf of claim 14, wherein a slip resistant pad is mounted to the underside end of each support rail where they rest upon the pickup truck camper shell.

16. The utility shelf of claim 14, wherein a telescoping extender is incorporated in the outward end of each support rail that extends out to contact the sides of the camper shell to inhibit lateral movement of the shelf assembly.

17. The utility shelf of claim 14, wherein a telescoping extender is incorporated in the support rails to inhibit lateral movement a tool free means is provided for said extender to be locked into position.

18. The utility shelf of claim 14, wherein the rectangular shelf panel is divided in two pieces at mid span and joined together at a division by means of a continuous hinge being affixed to each of the two said panel pieces.

19. The utility shelf of claim 15, wherein the hinge is incorporated mid span of each support rail and pivotal centers of said hinge aligning with a pivotal center of the continuous hinge in the shelf panel.

\* \* \* \* \*